United States Patent [19]

Tanaka

[11] Patent Number: 4,543,475
[45] Date of Patent: Sep. 24, 1985

[54] ANTIREVERSE MEANS FOR AN ODOMETER

[75] Inventor: Seizou Tanaka, Nagaoka, Japan

[73] Assignee: Nippon Seiki Kabushiki Kaisha, Niigata, Japan

[21] Appl. No.: 319,726

[22] Filed: Nov. 9, 1981

[30] Foreign Application Priority Data

Nov. 8, 1980 [JP] Japan .................. 55-159983[U]

[51] Int. Cl.⁴ .................................................. G01C 22/00
[52] U.S. Cl. ........................................ 235/96; 235/1 C;
235/139 A; 235/131 JA
[58] Field of Search ............. 235/96, 103, 95 R, 95 A, 235/95 B, 95 C, 1 C, 139 A, 131 JA

[56] References Cited

U.S. PATENT DOCUMENTS 3,667,671  6/1972  Hachtel ........................... 235/96
4,192,450  3/1980  Nezu .............................. 235/96
4,356,388 10/1982  Kobayashi et al. ............. 235/96

Primary Examiner—L. T. Hix
Assistant Examiner—Brian W. Brown
Attorney, Agent, or Firm—Koda and Androlia

[57] ABSTRACT

An antireverse rotation means which includes a resilient arm provided on and protruding from a side face of a pinion holder and an engagement portion formed on a side face of a digit wheel at a position corresponding to an end of said resilient arm. The resilient arm slides and rides over the engageable portion on the digit wheel without causing noise during positive rotation of the digit wheel; however, during the reverse rotation, the resilient arm engages with the engageable portion blocks reverse rotation of the digit wheel.

3 Claims, 8 Drawing Figures

ANTIREVERSE MEANS FOR AN ODOMETER

BACKGROUND OF THE INVENTION

1. Field of the Invention

The present invention relates to odometers and more particularly to odometers having antireverse and antisubtraction mechanisms.

2. Prior Art

Odometers having antisubtraction mechanisms which are constructed such that the digit wheel of the odometer displays increasing numbers when the drive shaft rotates in an additive direction but does not subtract from the display when the drive shaft is rotated in the opposite direction are widely known. One type of antisubtraction mechanism is a type which uses a one-way clutch such as a resilient pawl, etc. which is interposed between the drive gear and the least significant digit wheel of the odometer. The one-way clutch prevents the transmission of a reversing force of the drive shaft to the digit wheel. Furthermore, such a construction is disclosed in the U.S. Pat. No. 3,667,671.

However, in an odometer constructed with one-way clutches since the transmission torque between mutually adjacent digit wheels is small, it is difficult to completely prevent reverse rotation of the digit wheels by means of only a one-way clutch. In other words, a very small torque is transmitted through the one-way clutch in the reverse direction and the least significant digit wheel can be driven in the reverse direction. If the least significant digit wheel is rotated in the reverse direction, higher digit wheels are also rotated in the reverse direction with the result that subtraction occurs.

Consequently, it is necessary in actual application to add an antireverse mechanism to the one-way clutch mechanism to block the reverse rotation of the least significant digit wheel. Such a conventional antireverse mechanism is disclosed in the U.S. Pat. No. 4,192,450. In this mechanism, a spring plate equipped with a pair of antireverse pawls is utilized. A projection that permits the antireverse pawls to slide over it during the rotation of the digit wheel in the positive direction but blocks the reverse rotation of the digit wheel through engagement during reverse rotation is provided on the side face of the digit wheel.

However, because the antireverse pawls slide over the projections wheel resiliently bending during the rotation of the digit wheel in the positive direction, the innercircumferential surface of the digit wheel is struck by a rebound force that is a reaction to the bending of the antireverse pawls as it returns to the normal state every time the antireverse pawls pass over the projection. As a result, a problem occurs in that the noise is generated at each impact. These impacts are intermitted and echo through the circumferential surface of the digit wheel. The generation of such noise is against the general trend in automobiles and other motor vehicles wherein it is desirable to reduce the noise in the interior of the motor vehicle. Furthermore, because the spring plate in such a prior art antireverse mechanism is provided with a pair of antireverse pawls, the antireverse pawls hit twice in each sequence of rotation and thus create even more noise. In addition, since the spring plate having the antireverse pawls must be inserted onto the shaft by using the fitting between the groove and the projection, the construction becomes complicated requiring more labor and higher cost.

SUMMARY OF THE INVENTION

Accordingly, it is a general object of the present invention to provide an antireverse mechanism wherein the antireverse pawls are prevented from creating echos by hitting the innersurface of the digit wheel.

It is another object of the present invention to provide an odometer which is capable of operating very quietly.

It is still another object of the present invention to provide an antireverse mechanism which is simple, easy to construct and lower in cost.

The above-mentioned objects of the present invention can be accomplished by an unique antireverse rotation means. The antireverse rotation means is for use in an odometer of the type including a plurality of digit wheels from the least significant to the most significant digit wheels, a pinion gear provided between each of the digit wheels for transmitting rotation from the least significant digit wheel to the most significant digit wheel, a pinion gear support for supporting the pinion gears provided between the digit wheels and a one-way clutch means provided between the least significant digit wheel and a rotating source. The antireverse rotation means includes a resilient arm provided on and protruding from the pinion gear support and an engagement portion provided on a side face of the least significant digit wheel and corresponding to the resilient arm such that the arm only engages with the engageable portion when the least significant digit wheel is rotated in a reverse direction whereby a reverse rotation of the least significant digit wheel is prevented.

In a preferred embodiment, a depression is provided in the side face of the least significant digit wheel adjacent the engageable portion such that when the least significant digit wheel is rotated at a positive direction, the resilient arm slides over the engageable portion and snaps into and out of the depression without causing any substantial noise.

BRIEF DESCRIPTION OF THE DRAWINGS

The foregoing features and objects of the present invention will become more apparent by reference to the following description taken in conjunction with the accompanying drawings, wherein like reference numerals denote like elements, and in which.

DETAILED DESCRIPTION OF THE INVENTION

Figure 1:
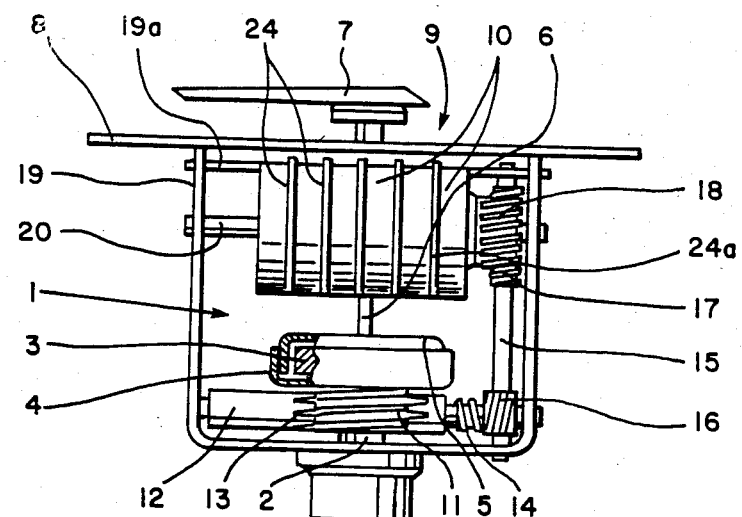
FIG. 1 is a front view of the essential parts of a measuring instrument showing an embodiment provided with an apparatus of the present invention.

Referring to FIG. 1, shown therein is an odometer incorporated into a speedometer mechanism. The odometer-speedometer mechanism includes an eddy-current type tachometer 1 to which is to transmit the rotary drive from the drive source of the vehicle by means of a flexible wire (not shown in the figures). The drive source of the vehicle rotates the shaft 2 which results in rotation of the magnet 3 which causes the magnetic field formed around the magnet 3 to act on the body 5 through a magnetic circuit connected through the magnetic conductor 4. As a result of the magnetic interconnection, the indicator shaft 6 is rotated at a speed which is proportionate with an elasticity of a hair spring (not shown in the figures) with the result of measurement of the vehicle speed by reading the value 9 indicated by the indicator 7 provided on the end of the indicator shaft 6 onto the scale on the dial plate 8 is achieved.

The odometer 9 is also widely known and is usually constructed to display distance as digits from the lower order digit wheel 10 to the higher order digit wheel 10. A horizontal shaft 12 and a vertical shaft 15 are rotatably supported by frame 19 in such a manner that a gear portion 11 provided on the rotary shaft 2 intermeshes with the gear portion 13 formed on the horizontal shaft 12 in order to split off and transmit the rotational drive. Another gear portion 14 provided on the horizontal shaft 12 intermeshes with a gear 16 on the vertical shaft 15. Furthermore, another gear portion 17 formed on a vertical shaft 15 intermeshes with the gear drive 18 which in turn drives the least significant digit wheel of the digit wheel 10.

A shaft 20 rotatably holds the respective digit wheels 10 as well as the drive gear 18 and the shaft 20 is fixed to the frame 19.

Figure 5:
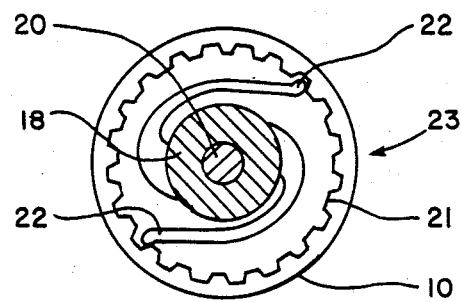
FIG. 5 is a side view of one directional clutch mechanism shown in FIGS. 1 and 2.

As shown in FIG. 5, an one directional clutch mechanism 23 is constructed in such a manner that engagement teeth 21 are formed on the innercircumferential surface of the lower order digit side of the least significant digit wheel 10 which is provided adjacent the drive gear 18. A pair of resilient pawls 22 protrude from the base of the outer circumference of the drive gear 18 and are formed into a single unit with the base. The pair of resilient pawls 22 formed on the drive gear 18 engage with the engagement teeth 21 of the least significant digit wheel 10 such that the ends of the resilient pawls 22 rotate the digit wheel 10 by engaging with the engageable teeth 21 only in the direction of additive transmission; in contrast, the resilient pawls 22 ride over the engagement teeth 21 and slide in the direction of the subtractive transmission.

Figure 2:
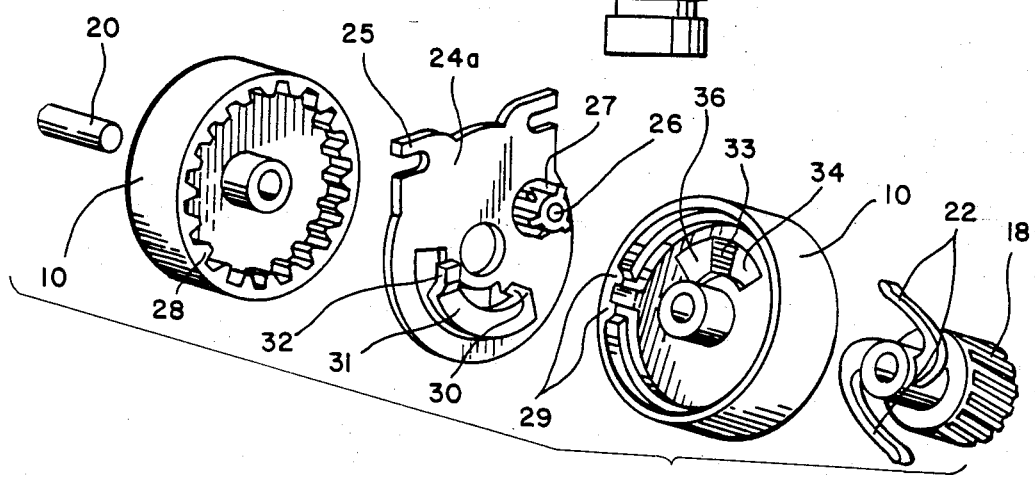
FIG. 2 is an exploded, perspective view of a digit wheel, a pinion, a holder and a monodirectional clutch having a gear drive which are the essential parts of the FIG. 1.
Figure 6:
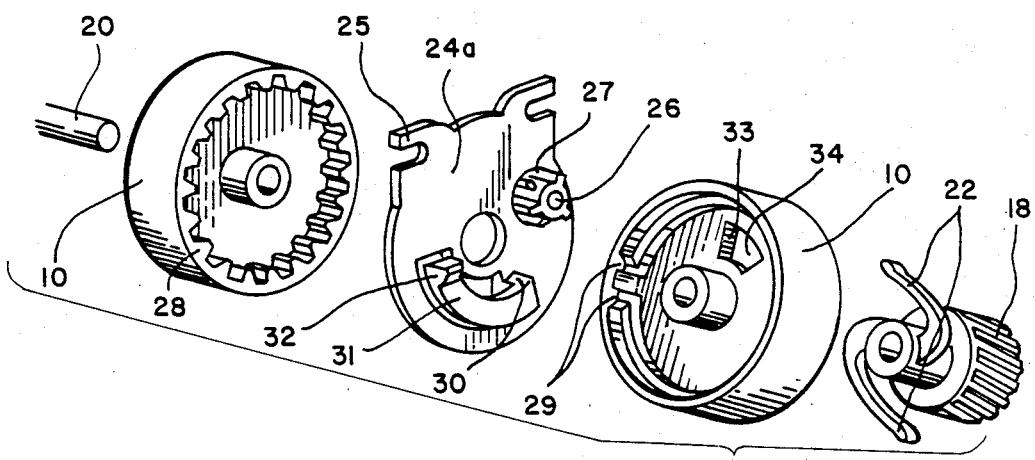
FIG. 6 is an exploded, perspective view corresponding to FIG. 2 of another embodiment of the present invention.

Also, as shown in FIGS. 2 and 6, between the digit wheels 10 of the odometer 9, pinion holders 24a are provided and are further supported by the shaft 20 inserted through the center of the holder 24a. From the outer circumference of the pinion holder 24a, engagement ears 25 stick out from the pinion holder 24a and are formed integrally with the pinion holder 24a. The engagement ears 25 fit into a horizontal plate 19a of the frame 19 thereby fixing the pinion holders 24a between the digit wheels 10.

Furthermore, on the side face of the pinion holder 24a in parallel with the axis of the shaft 20 is provided a pinion gear 27 which is rotatably supported by the pin 26.

On the innercircumferential surface of the respective lower order digit of the digit wheels 10, except the least significant digit wheel 10, a series of teeth 28 which engage with the pinion gear 27 are formed. On the innercircumferential face of the higher order digits of the digit wheels 10 is provided intermittent teeth 29 which intermittently engage with the pinion 27 at each rotation of the digit wheel 10 with the result that the lower order digits drive the higher order digits in sequence.

In the present invention, is further provided on the side face of the pinion holder 24a which is disposed between the least significant digit of the digit wheel 10 and the next digit adjacent thereto a base 30 which faces toward the least significant digit wheel 10. The base 30 is formed as an integral unit with the pinion holder 24a and on the base 30 is provided a resilient arm 31 which protrudes therefrom along a circumferential locus having the shaft 20 as its axial center. The arm 31 is further formed integrally with the base 30 and the pinion holder 24a. The free end of the resilient arm 31 is further projected towards the side face of the least significant digit wheel 10 in order to form an antireverse pawl 32. On the side face of the least significant digit wheel 10 is provided an engageable portion 33 having a circumferential locus and corresponding to the antireverse pawls 32 formed on the pinion holder 24a.

Figure 3:
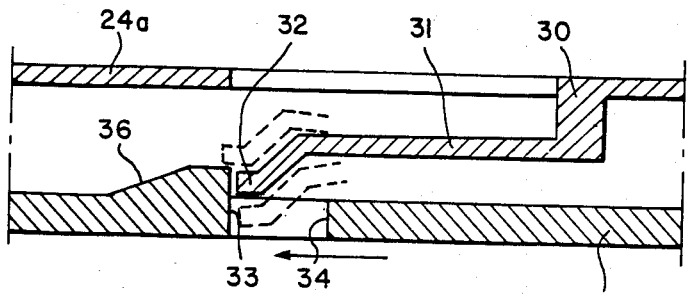
FIGS. 3 and 4 are sectional views illustrating the operating aspects of the mechanism of the present invention which are shown in the perspective view of FIG. 2.
Figure 4:
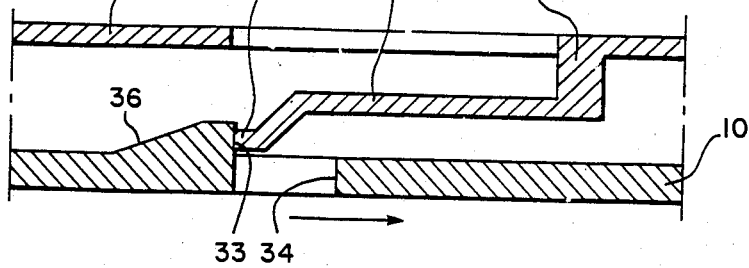

With such a construction, during the rotation of the digit wheel 10 in the positive direction (i.e. in the direction of additive transmission), the antireverse pawls 32 of the resilient arm 31 formed on the pinion holder 24a rides over and slides on the engageable portion 33 provided on the least significant digit wheel 10; while during the rotation in the direction of subtractive transmission, the antireverse pawl 32 engages with the engageable portion 33 and stops reverse rotation. In other words, when rotation in a positive direction is provided to the vertical shaft 15 from the rotary shaft 2 by way of the horizontal shaft 12, the drive gear 18 intermeshing with the gear portion 17 rotates around the shaft 20. As a result, the resilient pawls 22 of the one directional clutch 23 engages with the engageable teeth 21 of the least significant digit wheel 10 as shown in FIG. 5 in the least significant digit wheel 10 is rotated. The antireverse pawl 32 of the resilient arm 31 rides over and slides on the engageable portion 33, as shown in FIG. 3, and rotation of the least significant digit wheel 10 is transmitted to the next digit wheel 10 through the pinion gear 27 without any resistance to rotation of the least significant digit wheel 10. In contrast, when rotation in the opposite direction is caused through the vertical shaft 15 by the action of the least significant digit wheel 10 in the opposite direction, the resilient pawls 22 of the one directional clutch 23 slides or gradually riding over the engageable teeth 21 of the least significant digit wheel 10 thereby causing the least significant digit wheel 10 to try to maintain in a stationary position in spite of the reverse rotation of the drive gear 18. However, the one directional clutch 23 consisting of the resilient pawl 22 of the drive gear 18 and the engageable teeth 21 of the least significant digit wheel 10, if the frictional force due to resilient intermeshing between the resilient pawl 22 and the engageable teeth 21 is great, rotates the least significant digit wheel 10 in the reverse direction. Accordingly, the antireverse pawl 32 of the resilient arm 31 that is protruding from the pinion holder 24a engages with the engageable portion 33 and prevents rotation in the reverse direction as shown in FIG. 4. Therefore, the least significant digit wheel 10 is maintained in the stationary position and the resilient pawl 22 of the drive gear 18 and the engageable teeth 21 of the least significant digit wheel 10 which are the one directional clutch mechanism 23 reliably prevent the reverse rotation of the digit wheel 10.

Clearly, in the forward direction, the distance travelled by the vehicle can be added to and transmitted by driving the digit wheel 10 through the resilient interlocking of the resilient pawl 22 of the drive gear 18 with the engageable teeth 21 of the least significant digit wheel 10 and at the same time through the sliding of the antireverse pawl 32 of the resilient arm 31 over the engageable portion 33.

For example, even when the flexible wires are detached from the drive source of the vehicle and separately connected to a motor, rotation of the wire in the opposite direction is prevented from being applied to the digit wheel 10 by the antireverse mechanism and the one-way clutch. Accordingly, by such construction, the illegal practice of turning back the odometer by driving the speedometer in the reverse direction is prevented.

Also, if a depression 34 larger than the length of the antireverse pawl 32 protruding from the resilient arm 31 of the pinion holder 24a is formed adjacent to the engageable portion 33 on the digit wheel 10 in the direction of subtractive rotation, during the rotation of the digit wheel 10 in the positive direction, that is, during the ordinary travelling of the vehicle, when the antireverse pawl 32 of the resilient arm 31 formed on the pinion holder 24a slides over the engageable portion 33 formed on the digit wheel 10, its deflexion is released and the antireverse pawl 32 tends to return to its original position by snapping downwardly. In this case, the antireverse pawl 32 with its deflexion force released tends to run into the side face of the digit wheel 10; however, the antireverse pawl 32 will snap into the depression 34 formed on the side face of the digit wheel 10 and any noise which would be caused by the antireverse pawl 32 is prevented. Accordingly, the antireverse rotation means of the present invention operates smoothly and quietly.

It should be apparent to one skilled in the art that the depression 34 may be a hole or just a recession provided at the side face of the digit wheel 10. It should be further apparent that during the rotation of the digit wheel 10 in the positive direction, after the antireverse pawl 32 slides over and rides past the engageable portion 33, the antireverse pawl 32 goes into the depression 34 slightly, due to reaction, as shown in FIG. 3, but it immediately comes back to the original position. Therefore, the rotation of the digit wheel 10 in the positive direction continues. On the other hand, during the rotation of the digit wheel 10 in the opposite direction, as is shown in FIG. 4, the antireverse pawl 32 is locked by engaging with the engageable portion 33 having a large rising area.

Figure 7:
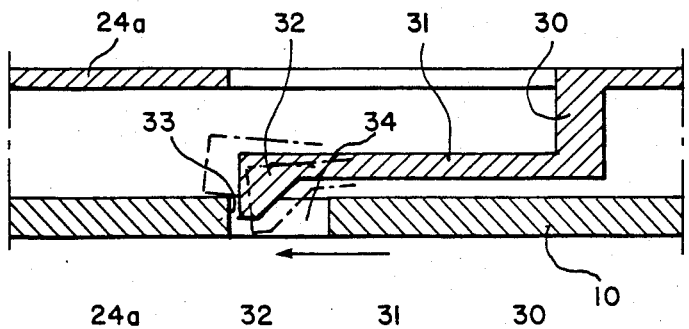
FIGS. 7 and 8 are sectional views illustrating the operational aspects of the embodiment shown in FIG. 6.
Figure 8:
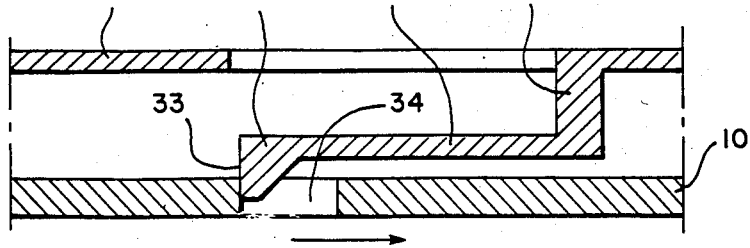

In addition, shown in FIG. 3 is a perspective view of a second embodiment wherein the antireverse pawl 32 of the resilient arm 31 is formed to be fixed, and as is shown in FIGS. 7 and 8, is designed such that the digit wheel 10 rotates in a condition with recoil strength accumulated in the resilient arm 31 through the slight pressing against the side face of the digit wheel 10 with the antireverse pawl 32. Therefore, during the rotation of the digit wheel 10 in the positive direction, as is shown in FIG. 7, when the antireverse pawl 32 rides over the engageable portion 33, the antireverse pawl 32 falls into the depression 34; but as the rotation continues the antireverse pawl 32 slides and comes out of the depression 34. Accordingly, the rotation of the digit wheel 10 in the positive direction continues. However, during the rotation of the digit wheel 10 in the opposite direction, as shown in FIG. 8, the antireverse pawl 32 falls into the depression 34 and is blocked by engagement with the engageable portion 33. It should be apparent that with this construction the same operational effect as the first embodiment of FIGS. 2, 3 and 4 can be obtained.

From the foregoing description, it should be apparent that the antireverse apparatus according to the present invention provides certain effects far more reliable than those provided by prior art constructions. Such advantages are as stated below:

1. Because of its construction, the end of the antireverse pawl 32 of the resilient arm 31 slides and rides past the engageable portion 33 only once for each rotation of the least significant digit wheel 10 and even if the antireverse pawl 32 gives a single-shot impact to the side face of the digit wheel 10 due to the reaction to ride past the engageable portion 33, it does not produce a noise by echoing.

2. Because it is designed with a depression 34 adjacent the engageable portion 33 in the direction of the subtractive rotation of the digit wheel 10, the end of the antireverse pawl 32 of the resilient arm 30 falls into the empty space due to the reaction after riding past the engageable portion 33 and any possible impact to the side face of the digit wheel 10 by the antireverse pawl 32 is prevented and quiet operation is assured.

3. Since the resilient arm 31 is formed on the pinion holder 24a, the resilient arm 31 rides past the engageable portion 33 during the rotation of the positive direction, the end of the antireverse pawl 32 of the resilient arm 31 can deeply engage with the engageable portion 33 to thereby positively prevent the reverse rotation.

It should be apparent to those skilled in the art that the above described embodiments are merely illustrative but a few of the many possible specific embodiments which represent the application of the principles of the present invention. Numerous and varied other arrangements can be readily devised by those skilled in the art without departing from the spirit and scope of the invention.

I claim:

1. An antireverse rotation means for use in an odometer of the type including a plurality of digit wheels for transmitting the rotary drive from the least significant digit wheel to the most significant digit wheel sequence by way of pinion gears, a one-way clutch means provided between a drive gear and the least significant digit wheel in order to rotate said least significant digit wheel through engagement with the drive gear during the positive rotation of the drive gear but to let said digit wheel stay in a stationary state during the reverse rotation of the drive gear, pinion holders each fixed between the digit wheels and supports said pinion gear in a manner that the pinion gear can be rotated through intermeshing with the teeth provided on the digit wheel, said antireverse rotation means comprising:

a resilient arm provied thereon and protruding from the pinion gear support;

an engageable portion provided on the side face of the least significant digit wheel and corresponding to said resilient arm; and depression each in a size at least larger than an antireverse pawl of the resilient arm and provided at a position adjacent to the engageable portion in a direction of subtractive rotation of the digit wheel such that during positive rotation of said drive gear, the antireverse pawl of the resilient arm disposed on the pinion holder slides over and rides past the engageable portion of the digit wheel and falls into the depression but again slides and comes out of the depression, and during reverse rotation of the drive gear, the engageable portion is engaged with the free end of the resilient arm and thus blocks rotation.

2. An antireverse rotation means for an odometer according to claim 1, wherein a base is provided on a side face of said pinion holder to face towards the least significant digit wheel and said resilient arm is provided on said base along a circumferential locus with a central axis of the pinion holder as well as said digit wheels and said free end of said resilient arm comprises an antireverse pawl by being stuck out towards a side face of the least significant digit wheel.

3. An antireverse rotation means for an odometer according to claim 1, wherein an engageable portion with a large rising area is formed by providing a protruding portion adjacent the engageable portion in a direction of additive rotation of said digit wheel.

* * * * *